UNITED STATES PATENT OFFICE.

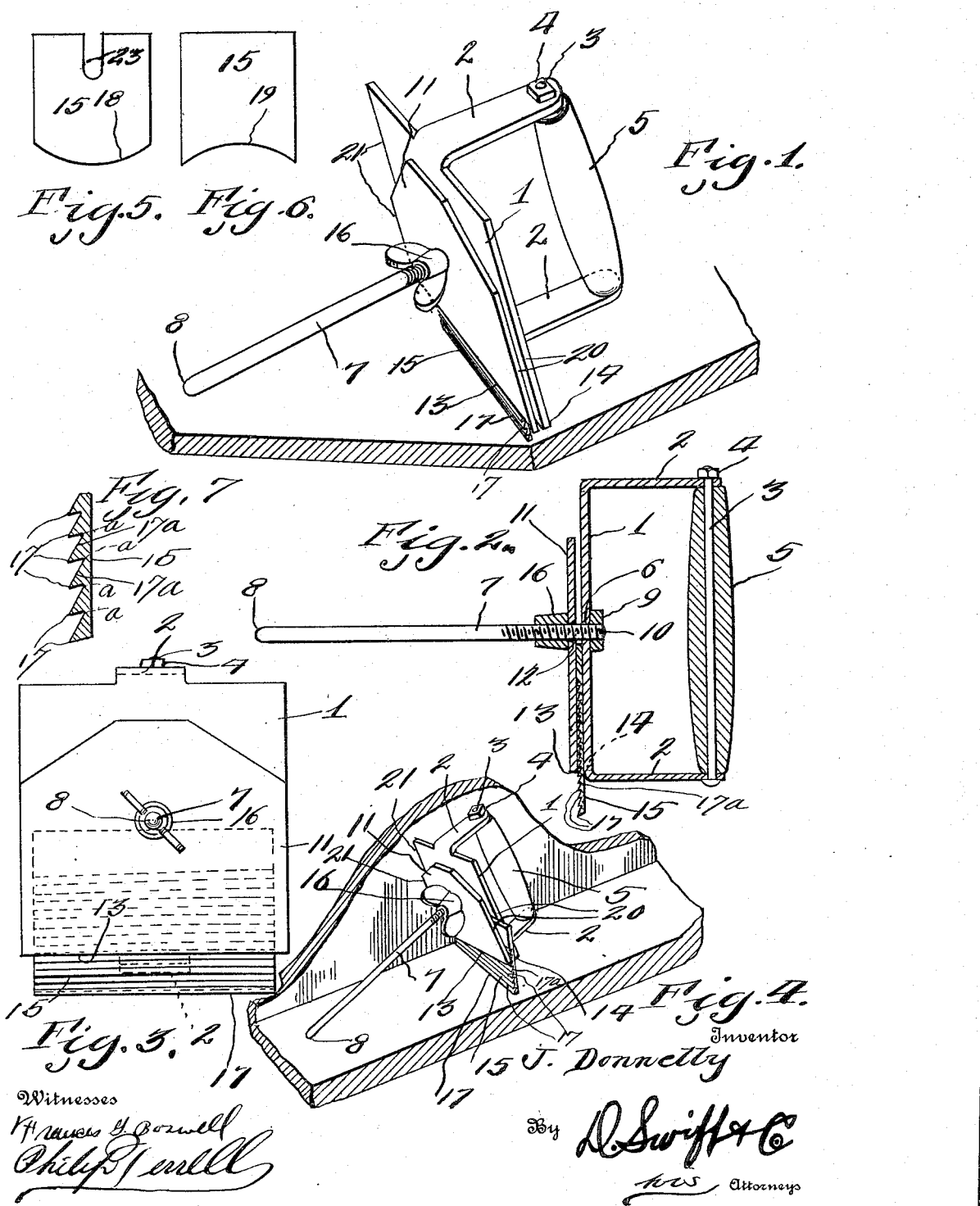

JOHN DONNELLY, OF BRANFORD, CONNECTICUT.

FLOOR-SCRAPING TOOL.

1,192,763.  Specification of Letters Patent.  Patented July 25, 1916.

Application filed October 20, 1915.  Serial No. 56,922.

*To all whom it may concern:*

Be it known that I, JOHN DONNELLY, a citizen of the United States, residing at Branford, in the county of New Haven, State of Connecticut, have invented a new and useful Floor-Scraping Tool; and I do hereby declare the following to be a full, clear, and exact description of the invention, such as will enable others skilled in the art to which it appertains to make and use the same.

This invention relates to a floor scraping tool, and an object of the invention is to provide a tool of this nature comprising simple, efficient and practical features of construction.

One of the features of construction resides in a body plate having laterally extending ears connected by a handle upon one side, and a centrally disposed shank upon the other side on which a clamping plate is arranged, to clamp a scraper blade against the body plate, there being means on the shank to clamp against the clamping plate to hold it in position.

Another object of the invention is to provide a simple, efficient and practical tool, which may be operated with one hand, so as to be pushed instead of pulled, over the floor, utilizing all the strength and weight of the arm and the body that is possible.

Another object of the invention is to provide means consisting of a prong or shank to steady, guide and hold the scraping tool on an even keel, as it is pushed over the floor or the like that is being scraped.

In practical fields the details of construction may necessitate alterations, falling within the scope of what is claimed.

The invention comprises further features and combination of parts, as hereinafter set forth, shown in the drawings and claimed.

In the drawings: Figure 1 is a view in perspective of the improved floor scraping tool, constructed in accordance with the invention. Fig. 2 is a vertical sectional view. Fig. 3 is a front elevation of the tool. Fig. 4 is a view showing the scraper blade adjusted on an angle, so as to scrape an inclined surface, at the same time holding the holder substantially vertical in front elevation and with the line of movement of the scraper. Fig. 5 is an elevation of the scraping blade and its convexed cutting edge. Fig. 6 is an elevation of the scraping blade and its concaved cutting edge. Fig. 7 is a detail view of the cutting blade shown in Figs. 1, 2, 3 and 4, more particularly showing the teeth in one face of the blade, so that when one cutting edge becomes dull or worn, the blade may be filed off to the other adjacent cutting edge, for each corner of each tooth is a cutting edge 17.

Referring more especially to the drawings 1 designates a body plate, which may be any suitable shape or configuration, preferably as illustrated in the drawings, and provided with a pair of ears 2 projecting from the upper and lower edges of the plate and in a lateral direction. A bolt 3 extends through the opposite ends of the ears and has a nut 4 threaded upon one end thereof to hold the bolt in place and connect the ears as shown, there being a suitable handle 5 on the bolt. Threaded into the body plate as at 6 is a stem, shank, or prong 7 having its free end rounded off as shown at 8. This prong or stem extends substantially centrally from the body plate 1, and in a direction from the ears 2, there being a lock nut 9 threaded at 10 upon the rear end of the stem or prong and against one face of the body plate, to lock the stem or prong securely to the body plate. A clamping plate 11 having a central aperture 12 is provided, and which is of a width substantially equal to the width of the body plate 1, but of less height than the body plate. However, when the clamping plate is in clamping position, its lower edge 13 is substantially flush with the lower edge 14 of the body plate. When the clamping plate 11 is in position, the prong or stem extends through the central aperture 12. A suitable scraper blade 15 is arranged between the clamping plate 11 and the body plate, and by turning the thumb nut 16 home and against the clamping plate 11, the scraper blade may be held in various adjusted positions, so that the cutting or scraping edge 17 is a little beyond the lower edges 13 and 14 of the clamping and body plates. In elevation the scraping or cutting edge of the scraper blade may be either convexed or concaved, as shown at 18 and 19 in Figs. 5 and 6, so as to scrape concaved and convexed surfaces. As shown in Fig. 4 the scraper blade may be adjusted on an angle, so as to scrape a surface, which is inclined on a plane at right angles to the line of movement of the scraping tool, and yet at the same time permit the holder for the blade to remain substantially vertical with the line of movement of the tool. If desired, the scraper blade may be adjusted so that its cutting or scraping edge is positioned a little beyond the right or the left hand edges 20 and 21 of the body and clamping plates, so as to scrape the side of a piece of wood, a wainscoting, wash board or the like, without changing the vertical position of the handle. In using the tool for scraping a flat surface, of a floor or the like, the tool is arranged as shown in Fig. 1, the body plate on an angle as shown, while the rounded end of the stem or prong engages the floor or other flat surface to support the tool on an angle as shown in Fig. 1, and somewhat guide the tool, the it is operated. In operating the tool, the operator kneels upon the floor, supporting his body with his left hand on the floor, using his right hand to grasp the handle 5 of the tool, and by shoving the tool forwardly and from the operator, the cutting or scraping edge 17 will scrape the flooring. As shown in Fig. 4 the scraper blade may be provided with a notch or recess, or slot 23, which receives the stem or prong at the center. The scraper blade illustrated in Figs. 1 to 4 inclusive is provided with a plurality of cutting edges 17, formed by the transverse teeth in one face of the blade, as indicated in Fig. 7 clearly, so that when one cutting edge 17 becomes worn or dull, that portion of the blade or cutting edge may be filed off to the next cutting edge, and so on, until all the cutting edges are used. In filing off that portion of the blade or cutting edge, the filing off is carried back to a point indicated at $a$.

The invention having been set forth, what is claimed as new and useful is:—

1. In a floor scraping tool, a body plate, a handle normal to the rear face of said plate and a rod extending from the opposite face of the plate and normal thereto and having an end for engagement with the floor, a scraping blade, a clamping plate on said rod, said rod having means acting against the clamping plate to hold the blade between the clamping and body plates.

2. In a scraping tool, a body plate, a handle comprising a pair of bars normal to the rear and the upper and lower edges of said rear plate, and a hand grip connecting the rear terminals of said bars and extending at right angles to the cutting edge of the scraping tool, the opposite face of said body plate having a rod normal thereto, the extremity of which is rounded to engage the surface to be scraped, a scraper blade, a clamping plate on said rod, and means on the rod acting against the clamping plate to hold the blade between the clamping and body plates.

3. In a floor scraping tool, a flat scraping blade provided upon its front face with a plurality of transverse cuts or notches in parallelism one above the other from the lower cutting edge of said blade, thereby forming sections each having a cutting edge, each of said sections when dulled readily detachable successively, thereby making a new edge available.

In testimony whereof I have signed my name to this specification in the presence of two subscribing witnesses.

JOHN DONNELLY.

Witnesses:
GEORGE R. STANNARD,
CHARLES A. HOADLEY.

Copies of this patent may be obtained for five cents each, by addressing the "Commissioner of Patents, Washington, D. C."